United States Patent
Munemura et al.

(10) Patent No.: US 12,479,042 B2
(45) Date of Patent: Nov. 25, 2025

(54) ELEMENT, FRICTION ELEMENT WELDING METHOD, AND METHOD FOR PRODUCING FRICTION ELEMENT WELDED JOINT

(71) Applicant: JFE STEEL CORPORATION, Tokyo (JP)

(72) Inventors: Naoaki Munemura, Tokyo (JP); Hiroshi Matsuda, Tokyo (JP); Yoshiaki Murakami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 47 days.

(21) Appl. No.: 18/018,140

(22) PCT Filed: Jul. 26, 2021

(86) PCT No.: PCT/JP2021/027532
§ 371 (c)(1),
(2) Date: Jan. 26, 2023

(87) PCT Pub. No.: WO2022/024987
PCT Pub. Date: Feb. 3, 2022

(65) Prior Publication Data
US 2023/0271270 A1    Aug. 31, 2023

(30) Foreign Application Priority Data
Jul. 31, 2020 (JP) .................... 2020-130132

(51) Int. Cl.
*B23K 20/12* (2006.01)
*B23K 101/18* (2006.01)
*B23K 103/04* (2006.01)

(52) U.S. Cl.
CPC ...... *B23K 20/1255* (2013.01); *B23K 2101/18* (2018.08); *B23K 2103/04* (2018.08)

(58) Field of Classification Search
None
See application file for complete search history.

(56) References Cited

U.S. PATENT DOCUMENTS 6,230,958 B1 * 5/2001 Coletta ............... B23K 20/129
228/114.5
6,769,595 B2 * 8/2004 Stol ................... B23K 20/1295
228/2.1

(Continued)

FOREIGN PATENT DOCUMENTS

CN         107999953 A  *  5/2018  ......... B23K 20/1255
DE   10 2017 221 681 A1     6/2019

(Continued)

OTHER PUBLICATIONS

Nov. 20, 2023 Extended European Search Report issued in European Patent Application No. 21849452.4.

(Continued)

*Primary Examiner* — Devang R Patel
(74) *Attorney, Agent, or Firm* — Oliff PLC

(57) ABSTRACT

An element, a friction element welding method, and a method for producing a friction element welded joint. The element is for performing friction element welding on a sheet stack of two or more stacked metal sheets by pressing the element into the sheet stack while the element is rotated. The element includes a circular columnar mandrel that is to enter the sheet stack, a circular collar disposed at an upper end portion of the mandrel, a first conical body extending from a lower end surface of the mandrel, and a second conical body disposed on the lower side of the first conical body. The vertical angle $\beta$ of the second conical body and the vertical angle $\alpha$ of the first conical body satisfy the relation $\beta < \alpha$.

11 Claims, 2 Drawing Sheets

(56) References Cited

U.S. PATENT DOCUMENTS

| | | | | |
|---|---|---|---|---|
| 8,277,923 | B2* | 10/2012 | Christ | B23K 20/129 |
| | | | | 403/270 |
| 10,589,374 | B2* | 3/2020 | Draht | B21J 15/025 |
| 2013/0094896 | A1* | 4/2013 | Christ | F16B 5/08 |
| | | | | 403/267 |
| 2013/0223921 | A1 | 8/2013 | Christ | |
| 2014/0224859 | A1* | 8/2014 | Utsumi | B05D 3/002 |
| | | | | 228/2.1 |
| 2017/0043525 | A1 | 2/2017 | Wiethoff et al. | |
| 2017/0136571 | A1* | 5/2017 | Aayoma | B23K 20/1255 |
| 2020/0282489 | A1* | 9/2020 | Hori | B23K 20/1255 |
| 2022/0055696 | A1* | 2/2022 | Matsui | B23K 20/1265 |

FOREIGN PATENT DOCUMENTS

| | | | | |
|---|---|---|---|---|
| JP | 2000-510768 | A | | 8/2000 |
| JP | 2010531737 | A * | 9/2010 | B23K 20/129 |
| JP | 2013-527804 | A | | 7/2013 |
| JP | 2013-534994 | A | | 9/2013 |
| JP | 2017-517420 | A | | 6/2017 |
| WO | 02062518 | A1 | | 8/2002 |

OTHER PUBLICATIONS

Sep. 28, 2021 International Search Report issued in International Patent Application No. PCT/JP2021/027532.
Sep. 27, 2024 Office Action issued in Korean Patent Application No. 10-2023-7002954.

* cited by examiner (a)

(b)

ELEMENT, FRICTION ELEMENT WELDING METHOD, AND METHOD FOR PRODUCING FRICTION ELEMENT WELDED JOINT

TECHNICAL FIELD

This application relates to friction element joining referred to as FEW (friction element welding). More particularly, the application relates to an element for friction element welding of two or more stacked metal sheets such as steel sheets (e.g., ordinary steel sheets, high-tensile steel sheets, etc.) and light metal sheets (e.g., aluminum sheets, aluminum alloy sheets, copper sheets, etc.) and also relates to a friction element welding method using the element and a method for producing a friction element welded joint.

BACKGROUND

In recent years, studies for solving environmental problems such as global warming are being conducted in various fields. In the automobile industry, techniques for reducing fuel consumption (i.e., improving fuel economy) to thereby reduce $CO_2$ emissions have been developed. In one practically used technique, an electric motor is also used (i.e., a hybrid technique). In another technique, high strength steel sheets called ultra-high tensile steel sheets are used to reduce the amount of the steel sheets used to thereby reduce the weight of a vehicle body and increase the safety of the driver and passengers.

In another technique studied for further reducing the weight of the vehicle body, a light metal (such as an aluminum alloy or copper sheets) is used for the vehicle body. To mass-produce such vehicle bodies in a production line, a technique for firmly joining together a light-metal material and a steel-made frame used as the vehicle frame is necessary.

Steel sheets have been conventionally used for vehicle bodies, and general-purpose fusion welding methods (such as arc welding and resistance spot welding) have been widely used. However, to join the steel sheet and the light metal sheet together as described above, the conventional fusion welding methods cannot be used. For example, when a fusion welding method is used to join a high strength steel sheet and an aluminum alloy sheet together, an intermetallic compound of Fe and Al is formed, and this causes a problem in that the weld is embrittled significantly.

Accordingly, a technique for joining a steel sheet and a light metal sheet without fusion has been studied. Non Patent Literature 1 discloses a representative example of such a technique that uses a metallic joint member (hereinafter referred to as an element) to perform friction element welding. In this technique, metal sheets are stacked to form a sheet stack, and the element rotated at high speed is caused to enter the sheet stack under pressure (hereinafter referred to as being pressed into the sheet stack) to thereby join the metal sheets together.

Patent Literature 1 discloses an element that can be preferably used for friction element welding. This element includes a mandrel having a polygonal non-circular outer shape with a plurality of rounded corner regions, and force applied during the joining process assists and facilitates discharge of a plastically deformed portion of an upper sheet in a sheet stack.

An element disclosed in Patent Literature 2 includes a circular columnar mandrel, a circular collar protruding outward from the circumference of an upper end portion of the mandrel, and a circular conical pin protruding from the lower end surface of the mandrel. With the element in Patent Literature 2, when the element is pressed into a sheet stack, the apex of the pin is first brought into contact with the sheet stack, and the pin held at this position is rotated at high speed, so that frictional heat generated can be concentrated at a prescribed position.

These conventional techniques, i.e., the friction element welding technique disclosed in Non Patent Literature 1 and the friction element welding techniques using the elements and disclosed in Patent Literature 1 and Patent Literature 2, are effective when the lowermost one of two or more stacked metal sheets used as a sheet stack (this sheet is hereinafter referred to as a lower sheet) is a steel sheet, the uppermost metal sheet (the metal sheet disposed on the side with which the pin of the element is to be brought into contact) (this sheet is hereinafter referred to as an upper sheet) is a light metal sheet, and an intermediate metal sheet held between the upper and lower sheets is also a light metal sheet.

However, when friction element welding is performed using one of the conventional techniques on a sheet stack in which not only the lower sheet is a steel sheet but also the upper sheet is a steel sheet, the position of the center axis of the mandrel tends to fluctuate largely when the element is rotated at high speed with the mandrel in contact with the upper sheet to generate frictional heat, so that the frictional heat generated is not concentrated at a prescribed position of the upper sheet but is dispersed. Therefore, while the upper sheet is not easily softened, the mandrel deforms, so that a portion of the metal sheet extruded by the element pressed into the sheet stack cannot be discharged. In this case, the mandrel of the element does not easily penetrate the upper sheet, so that the sheets in the stack are not easily joined together.

CITATION LIST

Patent Literature

PTL 1: Japanese Unexamined Patent Application Publication (Translation of PCT Application) No. 2013-534994
PTL 2: Japanese Unexamined Patent Application Publication (Translation of PCT Application) No. 2013-527804

Non Patent Literature

NPL 1: Jamie D. Skovron, Brandt J. Ruszkiewicz, and Laine Mears, "INVESTIGATION OF THE CLEANING AND WELDING STEPS FROM THE FRICTION ELEMENT WELDING PROCESS," (ASME 2017 12th International Manufacturing Science and Engineering Conference collocated with the JSME/ASME 2017 6th International Conference on Materials and Processing, Jun. 4-8, 2017 Los Angeles, California, USA)

SUMMARY

Technical Problem

It is an object of the disclosed embodiments to solve the problem in the conventional techniques and to provide an element used to perform friction element welding on a sheet stack of two steel sheets including a steel sheet disposed as a lower sheet and a steel sheet disposed as an upper sheet or a sheet stack of three or more metal sheets including a lower sheet (i.e., a steel sheet), an upper sheet (i.e., a steel sheet), and at least one metal sheet (i.e., a steel sheet or a light metal sheet) held between the lower and upper sheets to thereby join the sheets together and provide a friction element welding method using the element and a method for producing a friction element welded joint using the element.

It is another object of the disclosed embodiments to provide an element that can be applied without any problem to friction element welding of a sheet stack of two metal sheets including a steel sheet disposed as a lower sheet and a light metal sheet disposed as an upper sheet or a sheet stack of three or more metal sheets including a lower sheet (i.e., a light metal sheet), an upper sheet (i.e., a steel sheet), and at least one steel sheet held between the lower and upper sheets and provide a friction element welding method using the element and a method for producing a friction element welded joint using the element.

Solution to Problem

When a technique suitable for friction element welding of a sheet stack of two steel sheets in which the lower and upper sheets are both steel sheets is developed, this technique can be easily applied to friction element welding of a sheet stack including a steel sheet disposed as the lower sheet and a light metal sheet softer than the steel sheet as the upper sheet. In view of this, the inventors have conducted studies on a technique for performing friction element welding on a sheet stack of two steel sheets.

The upper sheet in the sheet stack of two steel sheets is the steel sheet with which the mandrel of the element comes into contact before the mandrel is pressed into the sheet stack. Specifically, the upper sheet is a hard steel sheet. To perform friction element welding through the upper sheet, it is necessary that the element be rotated at high speed while the contact position between the mandrel and the upper sheet is prevented from fluctuating so that the frictional heat is concentrated at a prescribed position. Accordingly, the inventors have conducted various experiments in which the mandrel is brought into contact with a prescribed position of the upper sheet and held at this position while the element is rotated at high speed.

Then the inventors have found that it is effective to dispose a conical body on the lower end surface of the mandrel. Specifically, as the apex of the conical body rotating at high speed comes into contact with the upper sheet and the conical body gradually enters the upper sheet, the steel sheet is extruded. In this case, the amount of the steel sheet extruded corresponds to the volume of the conical body pressed into the upper sheet. When the extruded portion of the metal sheet can be smoothly discharged, the conical body continues entering the upper sheet with the position of the apex of the conical body maintained at a prescribed position.

Then, when the element can continue rotating at high speed (i.e., the mandrel can continue rotating at high speed) without positional fluctuations, the frictional heat generated is concentrated at the prescribed position, and this position is softened, so that plastic flow easily occurs. Therefore, when the softened and flowable metal (i.e., the metal in the plastically deformed upper sheet) can be smoothly discharged, the mandrel can enter and pierce the upper sheet.

Specifically, it has been found that, by disposing, on the lower end surface of the mandrel, a conical body having an apex with its angle (hereinafter referred to as a "vertical angle") set within a suitable range in order to smoothly extrude the flowable metal generated by the plastic flow of the upper sheet, the sheet stack of two steel sheets can be joined by friction element welding.

When the element of the disclosed embodiments is used to perform friction element welding on a sheet stack of two metal sheets including a steel sheet disposed as the lower sheet and a light metal sheet disposed as the upper sheet, the conical body gradually enters the upper sheet with its center axis held at a prescribed position because the upper sheet is soft. Moreover, the frictional heat generated by the mandrel is concentrated at the prescribed position, and this position is softened, so that plastic flow easily occurs. In addition, the conical body disposed on the lower end surface of the mandrel allows the flowable metal (hereinafter referred to as a "flowing metal") to be smoothly extruded, so that the occurrence of defective welding can be prevented.

This effect is enhanced significantly when two conical bodies with different vertical angles are used in combination.

The disclosed embodiments have been made based on the above findings.

Specifically, the element of the disclosed embodiments is an element for performing friction element welding on a sheet stack of two or more stacked metal sheets by pressing the element into the sheet stack while the element is rotated,
the element including: a circular columnar mandrel that is to enter the sheet stack; a circular disk-shaped collar disposed at an upper end portion of the mandrel; and a first conical body extending from a lower end surface of the mandrel,
wherein a diameter of the collar is larger than a diameter of the mandrel, wherein an outer circumferential portion of the collar has a downward inclined or curved shape,
wherein a center axis of the first conical body coincides with a center axis of the mandrel,
wherein the element further includes a second conical body disposed in contact with a lower side of the first conical body, wherein a bottom surface of the second conical body is smaller in diameter than a bottom surface of the first conical body, wherein a center axis of the second conical body coincides with the center axis of the mandrel, and
wherein a vertical angle $\beta(°)$ of the second conical body and a vertical angle $\alpha(°)$ of the first conical body satisfy the following relation:

$$\beta < \alpha.$$

Preferably, in the element of the disclosed embodiments, the vertical angle $\alpha(°)$ of the first conical body satisfies $$140 \leq \alpha < 180, \text{ and}$$

the vertical angle $\beta(°)$ of the second conical body satisfies $$90 \leq \beta < 140.$$

Preferably, a distance L (mm) from a lowermost end of the outer circumferential portion of the collar to an apex of the second conical body in a direction parallel to the center axis of the mandrel satisfies the following relation:

$$(T_{TOTAL} - T_{BOTTOM}) + 0.02 \text{ mm} \leq L \leq (T_{TOTAL} - T_{BOTTOM}) + 4 \text{ mm}$$

where $T_{TOTAL}$ (mm) is a total thickness of the sheet stack, and $T_{BOTTOM}$ (mm) is a thickness of a lower sheet in the sheet stack.

Preferably, the sheet stack to which the disclosed embodiments is applied is a sheet stack including a lower sheet formed from a steel sheet and an upper sheet formed from a light metal or a sheet stack including a lower sheet and an upper sheet that are formed from respective steel sheets. Preferably, an outer surface of the first conical body and an outer surface of the second conical body each have a coating film formed of a wear resistant material.

The friction element welding method of the disclosed embodiments is a friction element welding method including joining a sheet stack of two or more stacked metal sheets by pressing an element into the sheet stack while the element is rotated, wherein the element used is the element described above.

The friction element welded joint production method of the disclosed embodiments is a method for producing a friction element welded joint, the method including joining a sheet stack of two or more stacked metal sheets by pressing an element into the sheet stack while the element is rotated, wherein the element used is the element described above.

Advantageous Effects

According to the disclosed embodiments, friction element welding can be performed on a sheet stack of two stacked steel sheets (i.e., a sheet stack in which the lower and upper sheets are both steel sheets). In addition, the friction element welding can also be performed on a sheet stack of three or more stacked steel sheets or a sheet stack in which at least one light metal sheet is held between two steel sheets used as the lower and upper sheets, so that industrially significant effects can be obtained.

Moreover, the disclosed embodiments can be stably applied without any problem to friction element welding of a sheet stack of two metal sheets including a steel sheet disposed as the lower sheet and a light metal sheet disposed as the upper sheet or a sheet stack of three or more metal sheets including at least one steel sheet held between the lower sheet (i.e., a steel sheet) and the upper sheet (i.e., a light metal sheet), and the effect of preventing the occurrence of defective welding is obtained.

DETAILED DESCRIPTION

Figure 1:
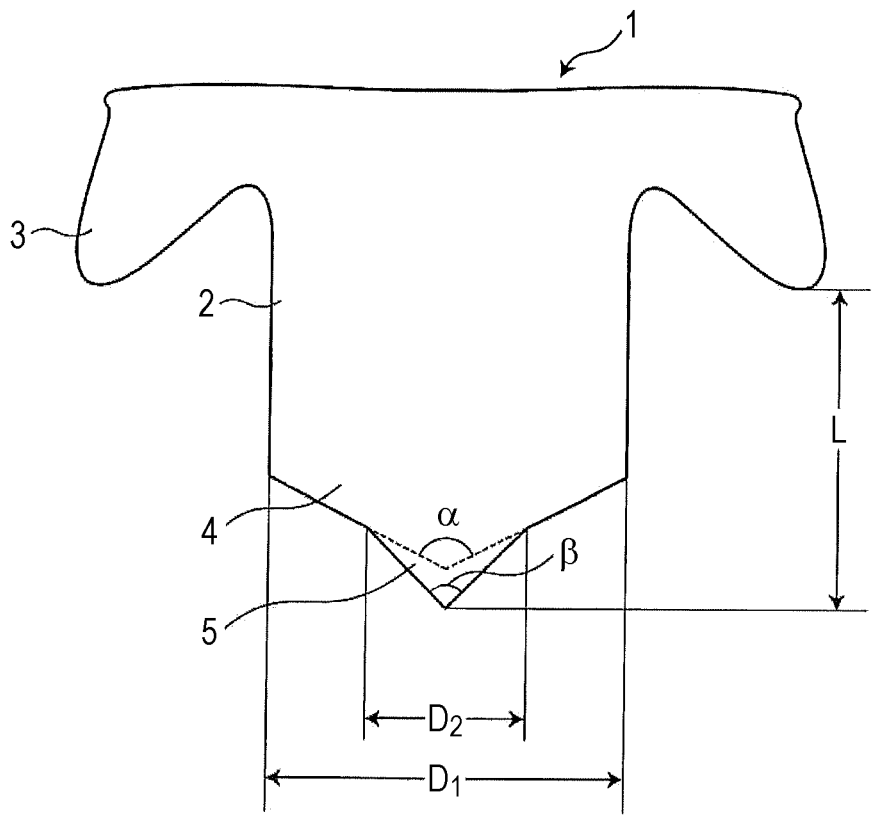
FIG. 1 is a cross-sectional view schematically illustrating an example of the element according to an embodiment.

Referring first to FIG. 1, the element of the disclosed embodiments will be described. FIG. 1 is a cross-sectional view schematically illustrating an example of the element of the disclosed embodiments. As shown in FIG. 1, the element 1 of the disclosed embodiments includes: a circular columnar mandrel 2 that is to enter a sheet stack when the sheet stack is subjected to friction element welding; a circular disk-shaped collar 3 disposed at a first end portion of the mandrel 2 (hereinafter referred to as an "upper end portion"), and a first conical body 4 having a conical shape and extending from a second end surface of the mandrel 2 (hereinafter referred to as a "lower end surface").

The diameter of the collar 3 is larger than the diameter of the mandrel 2. Therefore, an outer circumferential portion of the collar 3 is disposed so as to protrude outward from the circumference of the upper end portion of the mandrel 2. In addition, the outer circumferential portion of the collar 3 is formed so as to be inclined or curved downward.

The first conical body 4 extends from the lower end surface of the mandrel 2, and the center axis of the first conical body 4 (i.e., the center of its bottom surface) coincides with the center axis of the mandrel 2. Therefore, the lower end surface of the mandrel 2 is not exposed around the bottom surface of the first conical body 4. Specifically, the diameter of the bottom surface of the first conical body 4 is the same as the diameter of the lower end surface of the mandrel 2.

A second conical body 5 is disposed in contact with the lower side of the first conical body 4. The center axis of the second conical body 5 (i.e., the center of its bottom surface) coincides with the center axis of the first conical body 4. The bottom surface of the second conical body 5 is smaller in diameter than the bottom surface of the first conical body 4. Specifically, the diameter D2 (mm) of the bottom surface of the second conical body 5 and the diameter D1 (mm) of the bottom surface of the first conical body 4 must satisfy the following relation:

$$D2 < D1.$$

In other words, the inclined side surface of the first conical body 4 is exposed around the bottom surface of the second conical body 5. In this case, as the second conical body 5 enters the sheet stack, the flowing metal extruded by the second conical body 5 is smoothly discharged to the surface of the sheet stack (i.e., the side surface side of the mandrel 2) along the inclined side surface of the first conical body 4. The diameter D2 of the bottom surface of the second conical body 5 is preferably (D1×90%) (mm) or less and more preferably (D1×50%) (mm) or less.

When the diameter D2 of the bottom surface of the second conical body 5 and the diameter D1 of the bottom surface of the first conical body 4 satisfy D2≥D1, the inclined side surface of the first conical body 4 is not exposed around the bottom surface of the second conical body 5, and therefore the flowing metal is not easily discharged.

In the disclosed embodiments, it is only necessary that the above-described effect of discharging the flowing metal be obtained, and the lower limit of the diameter D2 of the bottom surface of the second conical body 5 is not particularly specified. From the viewpoint of facilitating the penetration into the sheet materials, the diameter D2 of the bottom surface of the second conical body 5 is preferably (D1×10%) (mm) or more and more preferably (D1×20%) (mm) or more.

It is necessary that the vertical angle β(°) of the second conical body 5 and the vertical angle α(°) of the first conical body 4 satisfy the following relation:

$$\beta < \alpha.$$

When this relation is satisfied, the center axis of the second conical body 5 can be maintained at a prescribed position stably when the element 1 is pressed into the sheet stack, and the extruded flowing metal can be discharged smoothly.

If the vertical angle α(°) of the first conical body 4 is excessively small, the distance from the bottom surface of the first conical body 4 to the apex of the second conical body 5 is large. In this case, when the element 1 is pressed into the sheet stack, it may be difficult to hold the element 1 such that the center axis of the second conical body 5 coincides with the center axis of the first conical body 4 (i.e., the center axis of the mandrel 2). If the vertical angle α(°) is excessively large, the effect of discharging the flowing metal smoothly may not be obtained. It is therefore preferable that the vertical angle α(°) satisfies $$140 \leq \alpha < 180.$$

If the vertical angle β(°) of the second conical body 5 is excessively small, the second conical body 5 may be easily damaged when the element 1 is pressed into the sheet stack, so that the position of the center axis of the second conical body 5 easily fluctuates. If the vertical angle β(°) is excessively large, the flowing metal may not be discharged smoothly. It is therefore preferable that the vertical angle β(°) satisfies $$90 \leq \beta < 140.$$

When the element 1 described above is used to perform friction element welding, the efficiently of the friction element welding performed can be increased by increasing the wear resistance of the first conical body 4 and the second conical body 5. It is therefore preferable that a coating film formed of a wear resistant material is formed on the outer surface of each of the first conical body 4 and the second conical body 5. No particular limitation is imposed on the wear resistant material so long as the operational advantage described above is obtained. Examples of the wear resistant material include WC, TiN, and other ceramics. A heat-resistant coating and hardening treatment such as nitriding may also be used.

Figure 2:
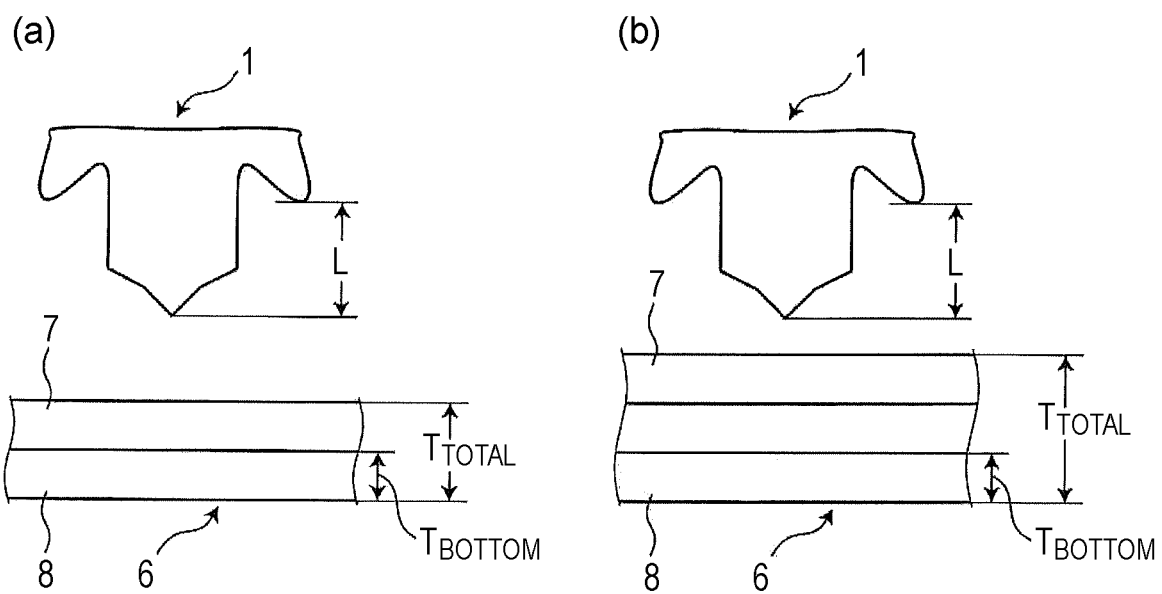
FIGS. 2(a) and 2(b) are cross-sectional views schematically illustrating examples of a sheet stack to be joined using the element shown in FIG. 1, FIG. 2(a) showing a sheet stack of two stacked metal sheets, FIG. 2(b) showing a sheet stack of three stacked metal sheet.

Referring next to FIGS. 1, 2(a), and 2(b), the relation between the sheet stack and the element will be described. FIG. 2(a) is a cross-sectional view of a sheet stack of two stacked metal sheets, and FIG. 2(b) is a cross-sectional view of a sheet stack of three stacked metal sheets.

The sheet stack 6 shown in FIG. 2(a) is composed of two stacked metal sheets including an upper sheet 7 and a lower sheet 8. The sheet stack 6 shown in FIG. 2(b) is composed of a total of three metal sheets including an upper sheet 7, a lower sheet 8, and a metal sheet held therebetween. The disclosed embodiments is also applicable to a sheet stack (not shown) composed of a total of four or more metal sheets including an upper sheet 7, a lower sheet 8, and two or more metal sheets held therebetween.

To perform friction element welding on the sheet stack 6 shown in FIG. 2(a) or 2(b) using the element 1 shown in FIG. 1, it is necessary that the mandrel 2 pass through the upper sheet 7 and reach the lower sheet 8. Therefore, a preferred range of the distance L (mm) from the lowermost end of the outer circumferential portion of the collar 3 to the apex of the second conical body 5 is specified as follows. The distance L is the length in a direction parallel to the center axis of the mandrel 2.

Let the total thickness of the sheet stack 6 be $T_{TOTAL}$ (mm), and the thickness of the lower sheet 8 be $T_{BOTTOM}$ (mm). Then, when the distance L in the element 1 used is set such that $$T_{TOTAL} - T_{BOTTOM} \leq \text{distance } L$$

is satisfied, the element 1 can be pressed into the upper sheet 7 from above such that the second conical body 5 reaches the lower sheet 8 to thereby perform friction element welding. However, in the course of pressing the element 1 into the sheet stack, the first conical body 4, the second conical body 5, and the mandrel 2 are softened by frictional heat. This causes plastic flow, and the flowing metal is discharged to the side surface side of the mandrel 2. Therefore, if the distance L is excessively small (e.g., $T_{TOTAL} - T_{BOTTOM}$=distance L), a problem arises in that the element 1 cannot reach the lower sheet 8. If the distance L is excessively large, a problem may arise in that, when the element 1 is pressed into the sheet stack, the mandrel 2 is likely to be deformed (e.g., bent, twisted, or buckled) above the upper sheet 7 (before the mandrel 2 enters the upper sheet 7), so that the mandrel 2 cannot by pressed into the sheet stack. It is therefore preferable that the distance L satisfies the following relation:

$$(T_{TOTAL} - T_{BOTTOM}) + 0.02 \text{ mm} \leq \text{distance } L \leq (T_{TOTAL} - T_{BOTTOM}) + 4 \text{ mm}.$$

The length further added to $(T_{TOTAL} - T_{BOTTOM})$ is not limited so long as the quality of the joint state of the interface is satisfactory, and the length is 0.02 mm or more. The length is preferably 0.2 mm or more and more preferably 0.5 mm or more. Specifically, the distance L is preferably equal to or more than $((T_{TOTAL} - T_{BOTTOM}) + 0.2 \text{ mm})$ and more preferably equal to or more than $((T_{TOTAL} - T_{BOTTOM}) + 0.5 \text{ mm})$. The upper limit of the length further added to $(T_{TOTAL} - T_{BOTTOM})$ is preferably 2 mm or less and more preferably 1.5 mm or less. Specifically, the distance L is preferably equal to or less than $((T_{TOTAL} - T_{BOTTOM}) + 2 \text{ mm})$ and more preferably equal to or less than $((T_{TOTAL} - T_{BOTTOM}) + 1.5 \text{ mm})$.

Figure 3:
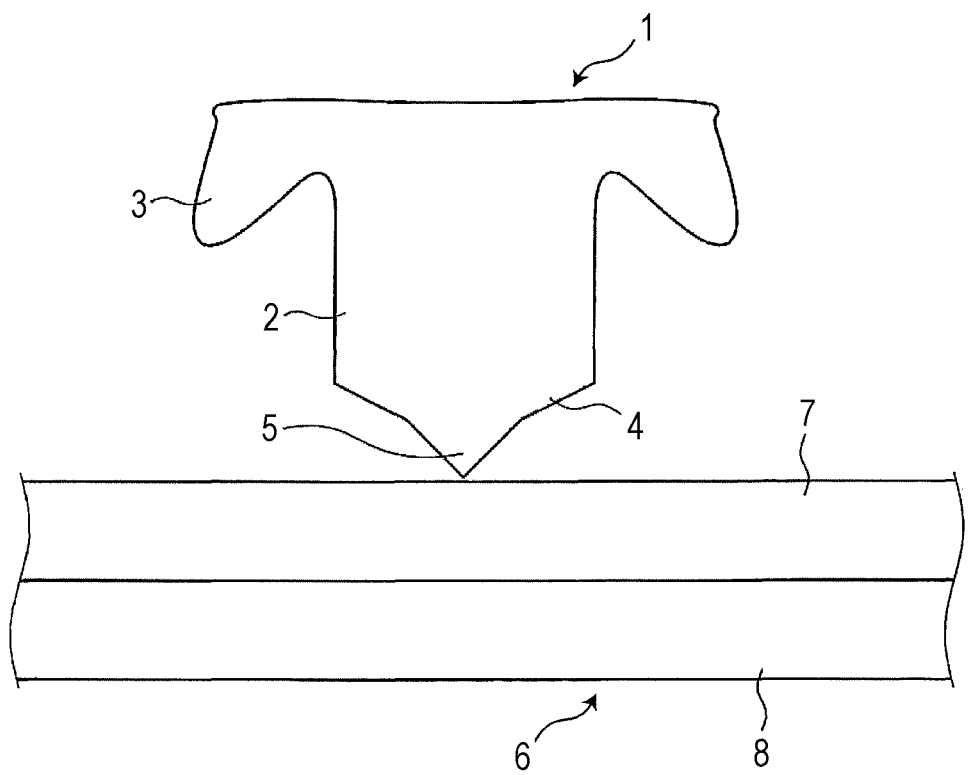
FIGS. 3(a) and 3(b) are cross-sectional views schematically illustrating examples of a sheet stack to be joined using the element shown in FIG. 1, FIG. 3(a) showing an example before the element is pressed into the sheet stack, FIG. 3(b) showing an example after the element has been pressed into the sheet stack.
Figure 3:
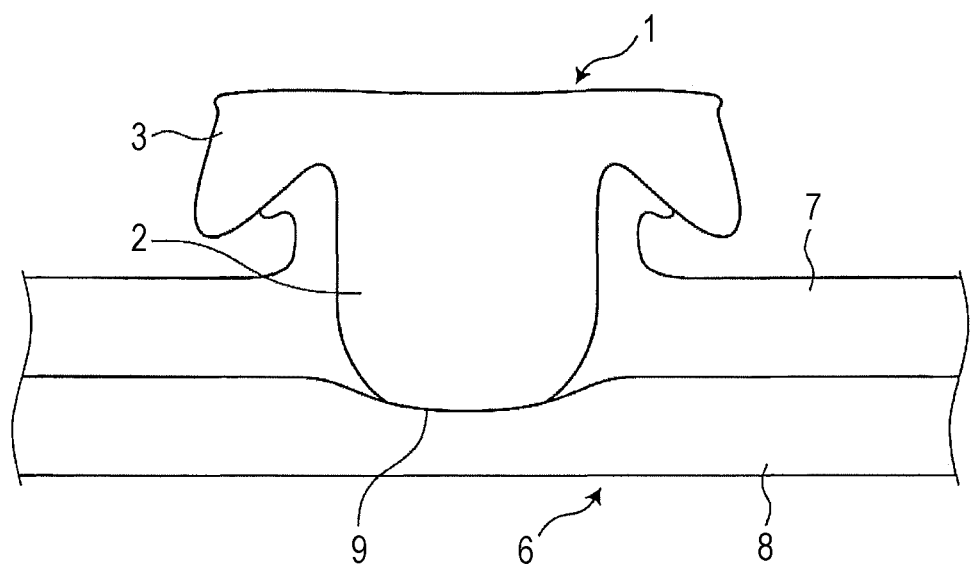

Referring next to FIGS. 3(a) and 3(b), the procedure of friction element welding using the element 1 will be described. FIGS. 3(a) and 3(b) are cross-sectional views schematically illustrating examples of the sheet stack 6 to be joined using the element 1 (see FIG. 2(a)). FIG. 3(a) shows an example before the element 1 is pressed into the sheet stack 6, and FIG. 3(b) shows an example after the element 1 has been pressed into the sheet stack 6. In FIGS. 3(a) and 3(b), the pressing device for pressing the element 1 into the sheet stack 6 is omitted.

When the element 1 is pressed into the sheet stack 6, the element 1 rotating at high speed is lowered from the upper side of the upper sheet 7, and the apex of the second conical body 5 comes into contact with the upper sheet 7 (see FIG. 3(a)). At this point, the center axis of the second conical body 5 and the center axis of the first conical body 4 (i.e., the center axis of the mandrel 2) are set to be perpendicular to the upper sheet 7. Then the element 1 rotating at high speed continues moving down, and the second conical body 5 gradually enters the upper sheet 7 from the apex. In this case, the center axis of the second conical body 5 serving as the rotation axis of the element 1 is maintained at a prescribed position.

Then the element 1 rotating at high speed further continues moving down, and the flowing metal is discharged to the side surface side of the mandrel 2 along the side surface of the first conical body 4. Specifically, the flowing metal extruded by the second conical body 5 pressed into the sheet stack is discharged to the side surface side of the mandrel 2 along the inclined side surface of the first conical body 4.

Since the element 1 continues moving down while rotating at high speed, frictional heat is generated between the lower end surface of the element 1 and the upper sheet 7 and between the side surface of the element 1 and the upper sheet 7, so that the heated upper sheet 7 undergoes plastic flow. Then the softened portion of the upper sheet 7 is discharged to the side surface side of the mandrel 2. In this manner, the element 1 can be pressed into the sheet stack, and the mandrel 2 reaches the lower sheet 8, so that plastic flow occurs also in a surface layer portion of the lower sheet 8 (see FIG. 3(b)).

It is inevitable that the frictional heat causes the mandrel 2 to be softened. Therefore, at the time the mandrel 2 reaches the lower sheet 8, the first conical body 4 and the second conical body 5 have collapsed, and their shapes before the mandrel 2 is pressed into the sheet stack (see FIG. 1) no longer remain. When the pressure insertion of the mandrel 2 is stopped, the softened upper sheet 7, the softened lower sheet 8, and the softened mandrel 2 are fused together and solidified, and a joint surface 9 is formed between the lower sheet 8 and the mandrel 2.

The portion of the upper sheet 7 discharged in the course of pressing the mandrel 2 into the sheet stack moves upward along the side surface of the mandrel 2. The reason for this is that the lower sheet 8 is disposed below the mandrel and the downward movement of the flowing metal is inhibited. The discharged portion of the upper sheet 7 moves to a free space above the mandrel, protrudes into the free space, is then restrained by the outer circumferential portion of the collar 3, and thereby fixed to the element 1. Specifically, when the sheet stack 6 of two stacked metal sheets shown in FIG. 2(a) is subjected to friction element welding using the element 1 of the disclosed embodiments, the lower sheet 8 and the mandrel 2 are joined together at the joint surface 9, and the upper sheet 7 is fixed to the mandrel 2 and the collar 3 (see FIG. 3(b)).

Similarly, when the sheet stack 6 of three stacked metal sheets shown in FIG. 2(b) is subjected to friction element welding or when an unillustrated sheet stack of four or more stacked metal sheets is subjected to friction element welding, the lower sheet 8 and the mandrel 2 are joined at the joint surface 9, and the upper sheet 7 and the other metal sheet(s) (the metal sheet(s) held between the upper sheet 7 and the lower sheet 8) are fixed to the mandrel 2 and the collar 3.

When the element 1 of the disclosed embodiments is used to perform friction element welding, no particular limitation is imposed on the types of metal sheets stacked to form the sheet stack 6. However, when a steel sheet is disposed as the lower sheet 8, sufficient frictional heat is generated by the lower sheet 8 and the mandrel 2, and a firm joint is formed at the joint surface 9.

For example, the sheet stack 6 may be a sheet stack of two steel sheets including a steel sheet disposed as the lower sheet 8 and a steel sheet disposed as the upper sheet 7 or a sheet stack of three or more metal sheets including at least one metal sheet (a steel sheet or a light metal sheet) held between the lower sheet 8 (i.e., a steel sheet) and the upper sheet 7 (i.e., a steel sheet). Moreover, the sheet stack 6 may be, for example, a sheet stack of two metal sheets including a steel sheet disposed as the lower sheet 8 and a light metal sheet disposed as the upper sheet 7 or a sheet stack of three or more metal sheets including at least one steel sheet held between the lower sheet 8 (i.e., a steel sheet) and the upper sheet 7 (i.e., a light metal sheet).

The technique of the disclosed embodiments is, of course, applicable to a sheet stack including a steel sheet serving as the lowermost metal sheet, a light metal sheet serving as the uppermost metal sheet, and another light metal sheet serving as an intermediate metal sheet held between the lower and upper sheets.

The element 1 of the disclosed embodiments includes two conical bodies with different vertical angles, and the flowing metal can be discharged smoothly. Therefore, friction element welding can be performed without any problem on the sheet stack 6 in which not only the lower sheet 8 is a steel sheet but also the upper sheet 7 is a steel sheet, so that, in the joint obtained, the sheets in the stack 6 are firmly jointed together.

As described above, in the friction element welding method of the disclosed embodiments that uses the element described above, the element of the embodiments is pressed into a sheet stack of two or more stacked metal sheets while rotated to thereby join the sheets in the sheet stack together.

In the friction element welded joint production method of the disclosed embodiments that uses the element described above, the element of the embodiments is pressed into a sheet stack of two or more stacked metal sheets while rotated to thereby join the sheets in the sheet stack together.

The friction element welding conditions in these cases are appropriately adjusted such that the above-described effects are obtained. Preferred welding conditions include an element rotation speed (rpm) of 500 to 9000 rpm and a pressing force (kN) of 3 to 9 kN. When friction element welding is performed in any of these methods, the above-described effects can also be obtained. The procedure of the friction element welding has already been described, and the description thereof will be omitted.

EXAMPLES

Embodiments will next be described in more detail by way of Examples. The following Examples do not limit the disclosed embodiments, and any modifications that satisfy the gist of the embodiments are also included in the technical scope of the disclosed embodiments.

The element shown in FIG. 1 was used to perform friction element welding on a sheet stack of a total of two stacked steel sheets shown in FIG. 3(a) and including upper and lower sheets. In some sheet stacks used, a total of three metal sheets were stacked together. Combinations of upper and lower sheets and combinations of three metal sheets are as shown in Table 1. The rotation speed (rpm) of the element and the pressing force (kN) during friction element welding performed on each sheet stack are as shown in Table 2. The shapes of the elements used are as shown in Table 2. A "heat resistant oxide coating" shown in Table 2 was used as the "heat resistant coating" exemplified above as the coating film formed of the wear resistant material. For comparison purposes, elements including only one conical body were used to perform friction element welding.

TABLE 1

| Sheet stack | Lower sheet | | | Upper sheet | | | Between lower and upper sheets | | |
|---|---|---|---|---|---|---|---|---|---|
| | Tensile strength | Thickness t | Metal sheet | Tensile strength | Thickness t | Metal sheet | Tensile strength | Thickness t | Metal sheet |
| a | 1470 MPa | 1.6 mm | Steel sheet | 980 MPa | 1.0 mm | Steel sheet | | | |
| b | 1470 MPa | 1.6 mm | Steel sheet | 980 MPa | 1.6 mm | Steel sheet | | | |
| c | 1470 MPa | 1.6 mm | Steel sheet | 1470 MPa | 1.0 mm | Steel sheet | | | |
| d | 1180 MPa | 1.6 mm | Steel sheet | 980 MPa | 1.0 mm | Steel sheet | | | |

TABLE 1-continued

| | Lower sheet | | | Upper sheet | | | Between lower and upper sheets | | |
|---|---|---|---|---|---|---|---|---|---|
| Sheet stack | Tensile strength | Thickness t | Metal sheet | Tensile strength | Thickness t | Metal sheet | Tensile strength | Thickness t | Metal sheet |
| e | 1470 MPa | 1.0 mm | Steel sheet | 980 MPa | 1.0 mm | Steel sheet | | | |
| f | 1470 MPa | 1.6 mm | Steel sheet | 1470 MPa | 1.0 mm | Steel sheet | 980 MPa | 1.0 mm | Steel sheet |
| g | 1470 MPa | 1.6 mm | Steel sheet | 270 MPa | 1.0 mm | Light metal sheet | 980 MPa | 1.0 mm | Steel sheet |

TABLE 2

| | | Element | | | | Welding conditions | | Evaluation of joint | | | Vertical angle | | |
|---|---|---|---|---|---|---|---|---|---|---|---|---|---|
| Joint No. | Sheet stack | Two conical bodies satisfying β < α | Diameter D1 of bottom surface of first conical body (mm) | Diameter D2 of bottom surface of second conical body (mm) | Distance L (mm) | Coating film | Rotation speed (rpm) | Pressing force (kN) | Appearance | Strength (kN) | Overall evaluation | α (°) | β (°) | Remarks |
| 1 | a | Yes | 4.55 | 1.5 | 5 | TiN | 6500 | 7 | ○ | 7.4 | A | 160 | 120 | Example |
| 2 | a | Yes | 4.55 | 1.5 | 5 | TiN | 6500 | 7 | ○ | 5.3 | B | 150 | 110 | Example |
| 3 | a | Yes | 5.5 | 1.4 | 5 | TiN | 6500 | 7 | ○ | 2.9 | C | 140 | 90 | Example |
| 4 | a | No | | | 5 | | 6500 | 7 | x | — | D | 140 | — | Comparative Example |
| 5 | b | Yes | 4.55 | 1.5 | 5 | TiN | 6500 | 7 | ○ | 2.6 | C | 150 | 100 | Example |
| 6 | b | No | | | 5 | | 6500 | 7 | x | — | D | 140 | — | Comparative Example |
| 7 | c | Yes | 4.55 | 1.5 | 5 | TiN | 6500 | 7 | ○ | 5.6 | B | 170 | 90 | Example |
| 8 | c | No | | | 5 | | 6500 | 7 | x | — | D | 140 | — | Comparative Example |
| 9 | d | Yes | 4.55 | 1.5 | 5 | TiN | 6500 | 7 | ○ | 7.2 | A | 160 | 110 | Example |
| 10 | d | No | | | 5 | | 6500 | 7 | x | — | D | 140 | — | Comparative Example |
| 11 | e | Yes | 4.55 | 1.5 | 5 | TiN | 6500 | 7 | ○ | 6.7 | A | 160 | 100 | Example |
| 12 | e | No | | | 5 | | 6500 | 7 | x | — | D | 140 | — | Comparative Example |
| 13 | f | Yes | 4.55 | 1.5 | 5 | TiN | 6500 | 7 | ○ | 2.3 | C | 130 | 120 | Example |
| 14 | g | Yes | 4.55 | 1.5 | 5 | TiN | 6500 | 7 | ○ | 2.2 | C | 130 | 80 | Example |
| 15 | a | Yes | 4.55 | 1.5 | 5 | | 6500 | 7 | ○ | 2.5 | C | 160 | 120 | Example |
| 16 | a | Yes | 4.55 | 1.5 | 5 | WC | 6500 | 7 | ○ | 7.1 | A | 160 | 120 | Example |
| 17 | a | Yes | 4.55 | 1.5 | 5 | Heat resistant oxide coating | 6500 | 7 | ○ | 7.0 | A | 160 | 120 | Example |
| 18 | a | Yes | 4.55 | 4.0 | 5 | TiN | 6500 | 7 | ○ | 2.6 | C | 160 | 120 | Example |
| 19 | a | Yes | 4.55 | 1.5 | 3 | TiN | 6500 | 7 | ○ | 6.7 | A | 160 | 100 | Example |

*1. $(T_{TOTAL} - T_{BOTTOM}) + 0.02$ mm ≤ L ≤ $(T_{TOTAL} - T_{BOTTOM}) + 4$ mm

Two joints (hereinafter referred to as "friction element welded joints") were produced for each of the joint Nos. shown in Table 2. One of the friction element welded joints was used for observation of the appearance of a cross section of the joint, and the welding state of the sheet stack was evaluated. Specifically, a friction element welded joint with the mandrel penetrating through the upper sheet and joined to the lower sheet (see FIG. 3(b)) was rated as "good welding (denoted by symbol: ○)," and a friction element welded joint with the mandrel not penetrating through the upper sheet and a friction element welded joint with the mandrel not joined to the lower sheet were rated as "defective welding (denoted by symbol: x)." The results of the evaluation are shown in Table 2.

The other one of the friction element welded joints with the welding state rated as "good welding (symbol: ○)" in the above appearance observation was used for a tensile test to examine the strength of the joint. The strength of the joint was measured according to JIS Z 3137.

A friction element welded joint with a strength of 6.0 kN or more was rated "excellent (A)," and a friction element welded joint with a strength of 3.0 kN or more and less than 6.0 kN was rated "good (B)." A friction element welded joint with a strength of 2.0 kN or more and less than 3.0 kN was rated "fair (C)." The results are shown in Table 2.

A friction element welded joint with the welding state rated as "defective welding (symbol: x)" in the above appearance observation was not subjected to the tensile test, and "poor (D)" was placed in the evaluation column in Table 2

As is clear from Table 2, all the joints in the Examples had good appearance, and their strength was 2.2 kN or more.

The invention claimed is:

1. An element for performing friction element welding on a sheet stack of two or more stacked metal sheets by pressing the element into the sheet stack while the element is rotated, the element comprising:
   a circular columnar mandrel configured to enter the sheet stack;
   a circular disk-shaped collar disposed at an upper end portion of the mandrel, a diameter of the collar being larger than a diameter of the mandrel;
   a first conical body extending from a lower end surface of the mandrel; and
   a second conical body disposed in contact with a lower side of the first conical body, a bottom surface of the second conical body being smaller in diameter than a bottom surface of the first conical body,
   wherein an outer circumferential portion of the collar has a downward inclined or curved shape,
   a center axis of the first conical body coincides with a center axis of the mandrel,
   a center axis of the second conical body coincides with the center axis of the mandrel,
   the bottom surface of the second conical body has an apex that terminates with a pointed tip,
   a vertical angle $\beta(°)$ of the second conical body and a vertical angle $\alpha(°)$ of the first conical body satisfy the following relation:

$\beta < \alpha$, the vertical angle $\alpha(°)$ of the first conical body satisfies $140 \leq \alpha < 180$, and
   the vertical angle $\beta(°)$ of the second conical body satisfies $90 \leq \beta < 140$.

2. The element according to claim 1, wherein a distance L (mm) from a lowermost end of the outer circumferential portion of the collar to the apex of the second conical body in a direction parallel to the center axis of the mandrel satisfies the following relation:

$(T_{TOTAL} - T_{BOTTOM}) + 0.02 \text{ mm} \leq L \leq (T_{TOTAL} - T_{BOTTOM}) + 4 \text{ mm}$ where $T_{TOTAL}$ (mm) is a total thickness of the sheet stack, and $T_{BOTTOM}$ (mm) is a thickness of a lower sheet in the sheet stack.

3. The element according to claim 2, wherein a lower sheet in the sheet stack is a steel sheet, and
   an upper sheet in the sheet stack is a light metal sheet.

4. The element according to claim 1, wherein a lower sheet in the sheet stack and an upper sheet in the sheet stack are both steel sheets.

5. The element according to claim 1, wherein an outer surface of the first conical body and an outer surface of the second conical body each include a coating film formed of a wear resistant material.

6. A friction element welding method comprising joining a sheet stack of two or more stacked metal sheets by pressing the element according to claim 1 into the sheet stack while the element is rotated.

7. A method for producing a friction element welded joint, the method comprising joining a sheet stack of two or more stacked metal sheets by pressing the element according to claim 1 into the sheet stack while the element is rotated.

8. The element according to claim 2, wherein an outer surface of the first conical body and an outer surface of the second conical body each include a coating film formed of a wear resistant material.

9. A friction element welding method comprising joining a sheet stack of two or more stacked metal sheets by pressing the element according to claim 3 into the sheet stack while the element is rotated.

10. A method for producing a friction element welded joint, the method comprising joining a sheet stack of two or more stacked metal sheets by pressing the element according to claim 3 into the sheet stack while the element is rotated.

11. The element according to claim 1, wherein the second conical body is a lowermost part of the element.

* * * * *

UNITED STATES PATENT AND TRADEMARK OFFICE
CERTIFICATE OF CORRECTION

| | | |
|---|---|---|
| PATENT NO. | : 12,479,042 B2 | Page 1 of 1 |
| APPLICATION NO. | : 18/018140 | |
| DATED | : November 25, 2025 | |
| INVENTOR(S) | : Naoaki Munemura et al. | |

It is certified that error appears in the above-identified patent and that said Letters Patent is hereby corrected as shown below:

In the Claims

Column 14, Lines 30-38, Claims 9 and 10 should read:

9. A friction element welding method comprising joining a sheet stack of two or more stacked metal sheets by pressing the element according to claim 2 into the sheet stack while the element is rotated.

10. A method for producing a friction element welded joint, the method comprising joining a sheet stack of two or more stacked metal sheets by pressing the element according to claim 2 into the sheet stack while the element is rotated.

Signed and Sealed this
Tenth Day of February, 2026

John A. Squires
*Director of the United States Patent and Trademark Office*